UNITED STATES PATENT OFFICE 2,552,055

THENYL XANTHATES AND TRITHIO-CARBONATES

Henry D. Norris, Woodbury, N. J., assignor to Socony-Vacuum Oil Company, Incorporated, a corporation of New York No Drawing. Original application May 16, 1947, Serial No. 748,669. Divided and this application December 8, 1948, Serial No. 64,263

1 Claim. (Cl. 260—329)

This invention relates to reaction products formed by the interaction of thenyl chloride type compounds with sulphur containing compounds of the group consisting of the alkali metal and alkaline earth metal salts of polythiocarbonic acid esters, alkali metal and alkaline earth metal sulphides and alkali metal and alkaline earth metal mercaptides.

The starting materials mentioned above were known prior to this invention, but insofar as is known, no reaction products have heretofore been prepared by reacting them together. These reaction products are useful as addition agents to lubricating oils, and as in intermediates for the preparation of further products.

Reactants

The thenyl chloride type of compound utilized in accordance with this invention may be thenyl chloride (chloromethyl thiophene) itself, or the corresponding compounds, chloromethyl thiophthene or chloromethyl thionaphthene. In any of these compounds the chloromethyl radical may be replaced by any other haloalkyl radical. The thenyl chloride type of compound may also contain additional ring substituents such as halo, alkyl, haloalkyl, alkaryl, or aralkyl radicals. In fact, any ring substituent or combination of substituents that does not interfere with the reaction of this invention may be present.

The sulphur containing compounds to be reacted with the thenyl chloride type of compound are exemplified by potassium ethyl xanthate, sodium disulphide and sodium ethyl mercaptide. A trithiocarbonate or a di- or trithiocarbamate may be used in place of a xanthate, the ethyl radical may be replaced by some other alkyl, aryl, aralkyl, alkaryl or even thienylalkyl radical, and the potassium, by sodium or any alkaline earth metal or an ammonium or amino radical. In the case of sodium disulphide, the sodium may similarly be replaced by potassium or any alkaline earth metal, or an ammonium or amino radical. In the interest of brevity, the alkali metals and the alkaline earth metals will be referred to hereinafter and in the claim as alkaline metals. The number of sulphur atoms may be one or any larger number. The ethyl radical of the mercaptan may be similarly changed to any desired organic radical.

Chloromethyl thiophene can be prepared from thiophene by the process described by Blicke and Burckhalter, Journal of the American Chemical Society, vol. 64, page 477 (1942). Other haloalkyl thiophenes may be prepared by analogous methods. By starting with a halothiophene, an alkylthiophene, or a haloalkyl thiophene, the corresponding haloalkyl (halothiophene) or haloalkyl (alkylthiophene), or even haloalkyl (haloalkyl thiophene) may be produced.

It has been discovered that any combination of the above mentioned starting materials will react smoothly to produce what is apparently a new compound. Of a considerable number of new compounds produced in accordance with this invention, all have been found to be valuable addition agents for mineral oil in that they improve its stability and its ability to lubricate under extremely high pressure. These compounds may also function in mineral oil to prevent bearing corrosion and improve the pour point, the viscosity index, and other properties.

The following examples of new compounds or compositions of matter in accordance with the principles of this invention, have been prepared as illustrative:

Example I

Potassium ethyl xanthate was reacted with 5-t-butyl-2-thenylchloride by first dissolving 34 g. (0.23 mol) of potassium ethyl xanthate in 200 cc. of ethyl alcohol. This mixture was heated to reflux and 32.5 g. (0.175 mol) of 5-t-butyl-2-thenylchloride was dropped in slowly at a rate that would just permit reflux to continue. After the addition was completed, the mixture was refluxed for 2 hours and the reaction mixture poured into twice its volume of distilled water. The oil that separated was dissolved in petroleum ether and the petroleum ether extract washed twice with water and dried over anhydrous sodium sulphate. The solution was then filtered and the solvent removed on a steam bath. There resulted 39.1 g. (83%, based on the amount of 5-t-butyl-2-thenylchloride used) of a straw colored liquid. Theoretically, this new compound should have the formula:

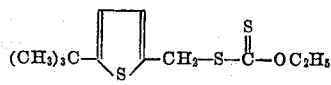

The calculated sulphur content for the new compound is 35.1%. Upon analysis the new compound was found to contain 33.9% sulphur.

Example II

Potassium ethyl xanthate was reacted with 5-chloro-2-thenylchloride in a similar manner by first dissolving 46 g. (0.32 mol) of potassium ethyl xanthate in 150 g. of ethyl alcohol. 38 g.

of 5-chloro-2-thenylchloride (0.245 mol) was added through the condenser in 3 portions. During the addition there was considerable heat evolved. As soon as the initial reaction subsided, the material was heated to reflux and refluxed for 1½ hours. Without cooling, the reaction was poured into twice its volume of distilled water. The oil which separated was dissolved in petroleum ether and washed 3 times with equal volumes of water. The solution was then dried over anhydrous sodium sulphate, filtered, and the solvent evaporated on a steam bath. The product was topped at 95° C. at 3 mm. of mercury pressure and yielded 39 g. (80% based on the amount of 5-chloro-2-thenylchloride used) of a straw colored oil. This compound should have the formula:

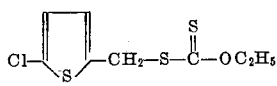

By calculation, the sulphur content should be 38% and the chlorine content 14.1%. By analysis the sulphur content was found to be 37.7% and the chlorine content 14.1%.

*Example III*

In a similar manner 1 molecular proportion of sodium disulphide was reacted with 2 molecular proportions of 5-t-butyl-2-thenyl chloride and yielded 86% (based on the amount of 5-t-butyl-2-thenyl chloride used) of a reddish oil. This oil should have the formula:

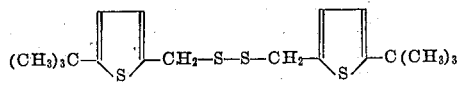

The calculated sulphur content was 34.6% and upon analysis 34.0% was found.

*Example IV*

In a similar manner 1 1/10 molecular proportions of sodium t-butyltrithiocarbonate were reacted with 1 molecular proportion of 5-t-butyl-2-thenyl chloride and the yield was found to be 58% of a yellow oil. The formula for this oil should be:

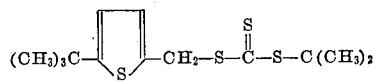

The calculated per cent of sulphur for a compound of this formula was 40.2% and upon analysis 37.8% sulphur was found.

*Example V*

In a similar manner 1 1/10 molecular proportions of potassium ethyl xanthate were reacted with 1 molecular proportion of 2,5-di-t-butyl-3-thenyl chloride and produced a yield of 88% of an amber-yellow oil. The formula for this oil should be:

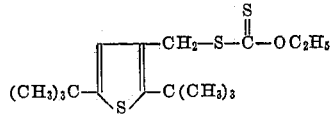

The calculated per cent of sulphur was 29.1% and that found by analysis was 28.0%.

*Example VI*

In the same manner 1 1/10 molecular proportions of potassium ethyl xanthate were reacted with 1 molecular proportion of 2,5-dibromo-3-thenyl chloride to produce a compound which should have the following formula:

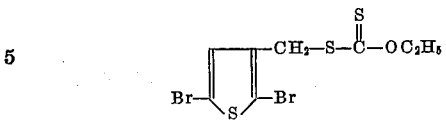

The calculated per cent of sulphur for this compound is 25.5% and that found by analysis was 25.6%.

In order to test the effectiveness of the compounds or compositions of this invention as improving agents for mineral oil, tests were conducted according to the following examples:

*Example VII*

A test known as the "Modified German Tar Test" consists in heating a 150 g. sample of the oil at a temperature of 120° C. while bubbling oxygen gas through the oil for a period of 70 hours. The quantity of acidic oxidation products formed is determined by titrating the acids formed in the oil with an alcoholic solution of potassium hydroxide and expressing the result as neutralization number (N. N.) which represents the milligrams of potassium hydroxide required to neutralize the acid present in one gram of oil.

To an oil having a Saybolt Universal viscosity at 100° F. of 69, a flash point °F. of 310 and specific gravity of 0.871, was added the amounts indicated in the table below of various of the products of the preceding examples. In all cases the neutralization number at the end of the test was far lower than that of the same oil without addition of the new compounds.

| Composition | Neutralization No. |
|---|---|
| Oil alone | 18.5 |
| Oil+0.2% of Product of Example I | 0.05 |
| Oil+0.2% of Product of Example II | 0.1 |
| Oil+0.2% of Product of Example III | 0.05 |
| Oil+0.2% of Product of Example IV | 0.1 |
| Oil+0.2% of Product of Example V | 0.18 |
| Oil+0.1% of Product of Example VI | 0.05 |

*Example VIII*

Another series of oil compositions was subjected to an Almen extreme pressure lubricant test and a Society of Automotive Engineers gear oil test.

In the Almen test, the Almen test machine is used, a 30 g. sample is placed in a small metal cup with a ¼ inch drill rod shaft rotating in a split bushing at 600 R. P. M. Weights are added at 10 second intervals to a loading lever working to apply pressure on the split bushing. Failure is evident by seizure. The Almen value is expressed as the number of weights added. Each weight weighs 2 pounds and is equivalent to 1000 pounds per square inch pressure. In the table below the highest torque developed is also given.

The S. A. E. test is performed on an S. A. E. gear test machine. 120 g. of oil sample is placed in the machine and the two steel test rings are adjusted in place. Shafts rotate the rings at different speeds against each other in the same direction so as to produce a combination of rolling and sliding action, while a gradually increasing load is applied. The main shaft rotates at 1000 R. P. M. and the rubbing ratio is 14.6 to 1. The loading rate is 75 pounds per minute. The test is continued until scoring occurs. Results are obtained in terms of pounds, on a scale reading a maximum of 580 pounds.

In the following tests, a solvent-refined mid-continent oil with a Saybolt Universal viscosity of 67 seconds at 210° F. was used. To it were added the indicated percentages of the products of the various examples above:

| Composition | S. A. E. Pounds Scale | Almen Load | |
|---|---|---|---|
| | | Weights | Torque |
| Oil Alone | 20 | 3 | |
| Oil+10% of Product of Example I | 500+ | 3 | 13 |
| Oil+5% of Product of Example II | 510+ | 8 | 75 |
| Oil+10% of Product of Example IV | 540+ | 22 | 72 |
| Oil+5% of Product of Example V | 510+ 346+ | 30 | 50 |

It will be apparent from the foregoing examples that when a thenyl chloride type of compound is reacted with a polythiocarbonate or a mercaptan that the reaction takes place in an approximately 1:1 ratio. When a thenyl chloride type of compound is reacted with a sulphide, however, the reaction takes place in the ratio of approximately 2 mols of the thenyl chloride type of compound to 1 mol of the sulphide.

In most instances, the use of ethyl alcohol as a diluent and the application of heat to bring the reaction mixture to a temperature such that the ethyl alcohol refluxes has been found desirable. The reaction in most instances is complete within two hours.

By using an alkyl substituted thenyl chloride type of compound in the reaction, and forming the alkyl substituent or substituents from relatively long chained hydrocarbons, such as those occurring in petroleum wax, reaction products can be produced which are particularly effective in improving the viscosity index and lowering the pour point of mineral oils. Thus, if there is used as a starting material a wax-substituted thiophene, in which the thiophene contains, preferably, from 1 to 3 wax substituents per molecule of thiophene, particularly desirable products can be obtained for the above-mentioned uses. Preferably the wax substituent, or substituents, is a mixture of relatively high molecular weight hydrocarbons, and the wax itself has a melting point of around 126° F., and an average number of carbon atoms of about 24. A range of melting points for the wax may be said to be from 110° F. to 140° F. and the average number of carbon atoms may be said to range from 18 to 30.

When the reaction products of this invention are to be used in mineral oil compositions, it is desirable to limit the number of carbon atoms in the thiocarbonate or mercaptan to six or less and to limit the length of the carbon chain connecting the thiophene ring to the thiocarbonate group in the reaction product to five or less. When the thenyl chloride type of compound is reacted with a polysulphide it is desirable, if the compound is to be used in oil, to limit the number of sulphur atoms in the polysulphide to four or less in order to prevent the compound from becoming unstable. The above limitations are given, not by way of limiting the scope of this invention insofar as it applies to new reaction products, but rather for the purpose of setting forth a preferred type of compounds for use in lubricating oil compositions.

For the purpose of stabilizing lubricating oil compositions against oxidation and acid formation, quantities of the order of 0.01% to 1% are generally satisfactory and, as illustrated in Example VII, quantities of 0.01% to 0.2% are generally sufficient. On the other hand, for improving the extreme pressure lubricating qualities of lubricating oil compositions, concentrations of the order of 3% to 20% have been found effective. Usually at least 3% is required to effect the desired improvement.

This application is a division of application Serial Number 748,669, filed May 16, 1947, now Patent No. 2,528,773.

What is claimed:

As a new composition of matter, a reaction product obtained from the reaction involving about one mol of 5-t-butyl-2-thenylchloride with about one mol of an alkali metal salt of polythiocarbonic acid ester selected from the group consisting of potassium ethyl xanthate and sodium t-butyl trithiocarbonate.

HENRY D. NORRIS.

REFERENCES CITED

The following references are of record in the file of this patent:

UNITED STATES PATENTS

| Number | Name | Date |
|---|---|---|
| 2,368,670 | Lincoln et al. | Feb. 6, 1945 |
| 2,381,483 | Blake et al. | Aug. 7, 1945 |

OTHER REFERENCES

Alles: J. Pharm. Exp. Ther. 72, 265 (1941).

Whitmore: Organic Chemistry, p. 893, Van Nostrand, N. Y., 1937.

Richter: Organic Chemistry, pp. 649–650, Wiley, N. Y., 1938.